US010606861B2

(12) United States Patent
Reddy et al.

(10) Patent No.: US 10,606,861 B2
(45) Date of Patent: Mar. 31, 2020

(54) METHOD FOR BUILDING DATA INTEGRATION TOOLS TO FACILITATE INTEROPERABILITY OF DATA INTEGRATION SOLUTIONS AMONG DATA INTEGRATION PLATFORMS

(71) Applicant: Tata Consultancy Services Limited, Maharashtra (IN)

(72) Inventors: Sreedhar Sannareddy Reddy, Maharashtra (IN); Prasenjit Das, West Bengal (IN); Raghavendra Yeddula Reddy, Maharashtra (IN)

(73) Assignee: TATA CONSULTANCY SERVICES LIMITED (IN)

( * ) Notice: Subject to any disclaimer, the term of this patent is extended or adjusted under 35 U.S.C. 154(b) by 771 days.

(21) Appl. No.: 14/551,766

(22) Filed: Nov. 24, 2014

(65) Prior Publication Data

US 2015/0081620 A1    Mar. 19, 2015

Related U.S. Application Data

(63) Continuation of application No. 13/252,630, filed on Oct. 4, 2011, now abandoned.

(30) Foreign Application Priority Data

Oct. 18, 2010    (IN) .......................... 2893/MUM/2010

(51) Int. Cl.
*G06F 16/25*     (2019.01)
*G06F 16/2453*   (2019.01)

(52) U.S. Cl.
CPC ...... *G06F 16/254* (2019.01); *G06F 16/24535* (2019.01); *G06F 16/24542* (2019.01); *G06F 16/256* (2019.01)

(58) Field of Classification Search
CPC ......... G06F 17/30557; G06F 17/30569; G06F 17/30914; G06F 17/30566; G06F 16/254
USPC ......................................................... 707/602
See application file for complete search history.

(56) References Cited

U.S. PATENT DOCUMENTS

| | | | |
|---|---|---|---|
| 5,970,490 A * | 10/1999 | Morgenstern | ..... G06F 17/30569 |
| 7,660,884 B2 * | 2/2010 | Pu | .......................... G06F 9/5077 709/223 |
| 7,689,582 B2 * | 3/2010 | Behnen | ...................... G06F 8/10 707/999.102 |
| 8,219,518 B2 * | 7/2012 | Jin | ............................ G06F 8/20 707/602 |
| 2002/0129145 A1 * | 9/2002 | Chow | ..................... H04L 29/06 709/225 |
| 2005/0243604 A1 * | 11/2005 | Harken | ...................... G06F 8/51 365/185.22 |
| 2006/0026115 A1 * | 2/2006 | Ahmed | ............. G06F 17/30451 |
| 2007/0214111 A1 * | 9/2007 | Jin | .................... G06F 17/30563 |

(Continued)

*Primary Examiner* — Alex Gofman
*Assistant Examiner* — Michael Le
(74) *Attorney, Agent, or Firm* — Hayes Soloway P.C.

(57) ABSTRACT

A method facilitating interoperability across the integrating platforms is provided by composing purpose specific integrating tools using conceptual modeling framework and a set of primitive foundational components. The model driven architecture provides easy migration from one solution architecture to another. Also, the present invention discloses a method to migrate from one implementation to another using set of composed purpose specific integration tools.

12 Claims, 6 Drawing Sheets

(56) References Cited

U.S. PATENT DOCUMENTS

2008/0092112 A1\* 4/2008 Jin ................... G06F 16/2448
                                                    717/106
2008/0147707 A1\* 6/2008 Jin ................... G06F 16/24537
2011/0061057 A1\* 3/2011 Harris ................ G06F 9/5072
                                                    718/104

\* cited by examiner

METHOD FOR BUILDING DATA INTEGRATION TOOLS TO FACILITATE INTEROPERABILITY OF DATA INTEGRATION SOLUTIONS AMONG DATA INTEGRATION PLATFORMS

CROSS REFERENCE TO RELATED APPLICATION

This application is a continuation application of U.S. application Ser. No. 13/252,630, filed Oct. 4, 2011, which claims priority from Indian Patent Application Ser. No. 2893/MUM/2010, filed Oct. 18, 2010, the contents of which are incorporated herein by reference.

FIELD OF THE INVENTION

The present invention relates to data integration and more particularly, to a method of composing purpose specific integration tools for facilitating migration from one integrating platform solution to another.

BACKGROUND OF THE INVENTION

The term data integration refers to the problem of combining data residing in heterogeneous sources and currently, it relates to wide range of technologies, from extract, transform and load (ETL) to enterprise application integration (EAI) to enterprise information integration (EII) and various change propagation technologies. There has been extensive theoretical research on data integration systems, exploring various mapping systems and languages, and their complex results and limitations. However no single technology suffices for all needs of an enterprise and these needs keep changing with growing data volumes and changing business needs. Consequently, enterprises end up tweaking their integration systems continually and sometimes summarily moving them from one technology to another, to keep up with these demands. This consumes a lot of effort—by some estimates as much as 40% of all IT efforts in an enterprise.

One reason why this consumes so much effort is the rigidity of the available integration technologies. Once a solution is implemented in one of these technologies, moving to another is like implementing the entire solution afresh which requires large amount of time, efforts and computational resources. As a result, people end up building ad-hoc, quick-fix solutions, which over time leads to data fragmentation and inconsistencies. Keeping these fragments synchronized to avoid inconsistencies puts a lot of strain on these systems.

Lack of common reference architecture and lack of a common set of foundational primitives from which purpose specific solutions can be composed are the principal reasons for this state of affairs.

Though there exist a large number of vendors with tool offerings in ETL, EAI, data migration, EII and so on, each uses one's own proprietary technology with no interoperability, sometimes even among tools of the same category (E.g. Vendor X's ETL tool to vendor Y's ETL tool). Some vendors offer tools in many categories (for example both ETL and EII), but again with no interoperability between a tool of one category and a tool of another. The principal reason for lack of interoperability among tools of the same category (say ETL) is the lack of common reference architecture across tool implementations. The principal reason for lack of interoperability across categories (say ETL and EII) is that their specifications are too close to the implementation platform i.e. they are not at a level of abstraction that allows their semantics to be mapped easily.

Moreover, the data inter-operability problem arises from the fact that data, even within a single domain of application, is available at many different sites, in many different schemas, and even in different data models. The integration and transformation of such data has become increasingly important for many modern applications that need to support their users with informed decision making.

While number of useful approaches has been devised for designing and deploying specific integration processes, there remains a need for tools to enable easy migration of the integration processes themselves, once designed, among different technology platforms.

OBJECTS OF THE INVENTION

In accordance with the present invention, a method of composing platform specific integration tools to facilitate easy migration from source implementation solution to target implementation solution is provided.

It is an object of the present invention to employ model driven common reference data integration architecture and set of primitive foundational components for composing platform specific integrating tools.

Another object of the invention is to identify primitive foundational components and combining them to build effective purpose specific integrating tools.

It is an object of the invention to identify primitive foundational components and combining them to build effective purpose specific migration tools which can be directly employed to migrate from one solution architecture to another.

It is yet another object of the present invention to facilitate interoperability across widely available data integration technologies.

Yet another object of the present invention is to combine GAV and LAV mappings to model complex data entities existing in a hierarchy.

It is another object of the present invention to support complex relationships ranging from hierarchical relationships to association relationships existing between data models via model driven architecture.

It is yet another object of the present invention to use platform independent representational formalism to represent complex query language, mappings and data flow graphs employed to build model driven data integration architecture.

It is further object of the present invention to present data flow graphs using rich meta models capable of being mapped to required platform specification for representing data dependencies between numbers of operations.

One of the objects of the present invention is to provide a query translation component for translation of query on source schema into an equivalent query on target schema.

Another object of the present invention is to provide query to data flow graph translation component to translate a given query into an equivalent data flow graph that can process data from multiple databases.

One of the objects of the present invention is to achieve performance optimization by performing a set of semantically invariant graph transformation operations on the generated data flow graph to obtain an optimal execution order on data flow operators.

SUMMARY OF THE INVENTION

It is the purpose of the present invention to provide a system and method for composing platform specific integration tools to facilitate easy migration across the integrating platforms by composing purpose specific integrating tools using conceptual modeling framework and a set of primitive foundational components.

In one of the preferred embodiments of the present invention a reference model driven architecture, a set of representational formalisms and a set of primitive foundational components that conform to this architecture is provided, and a method of composing these components to derive purpose specific integration tools, the said method comprising processor implemented steps of:

modeling the data at multiple levels of abstraction and capturing relationships, constraints and rules governing the behavior of the said models;

using the set of representational formalism to represent queries, mappings, rules and data flow graphs;

specifying set of primitive foundational components using which purpose specific data integrations tools are composed;

mapping between source schema and global schema using mapping component selected from primitive foundational components;

translating queries on a given model into equivalent target queries on other mapped data source models using primitive foundational components;

translating the target query into equivalent data flow graphs using primitive foundational components and;

executing the data flow graphs directly or translating the data flow graph into third party ETL and executing it thereof.

BRIEF DESCRIPTION OF THE ACCOMPANYING DRAWINGS

The foregoing summary, as well as the following detailed description of preferred embodiments, are better understood when read in conjunction with the appended drawings. For the purpose of illustrating the invention, there is shown in the drawings example constructions of the invention; however, the invention is not limited to the specific methods and system disclosed. In the drawings.

DETAILED DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

A variety of data integration tools exist, each with particular strengths and weaknesses. As a given user's needs evolve, the user may desire to move from using one tool to using another. A problem for such a user is that the user may have devoted significant time and resources to the development of data integration jobs using one tool and would not like to repeat the effort while moving to another tool. However, converting data integration jobs has to date required very extensive coding efforts. Thus, a need exists for improved methods and systems for converting data integration jobs that use one integration tool into data integration jobs that use a different integration tool.

As mentioned, there remains a need for the right reference architecture and a set of foundational primitives using which data integration problems can be addressed efficiently. The embodiments of the present invention addresses precisely this need by providing a method and a set of primitive components using which purpose specific integration tools can be composed efficiently.

Figure 1:
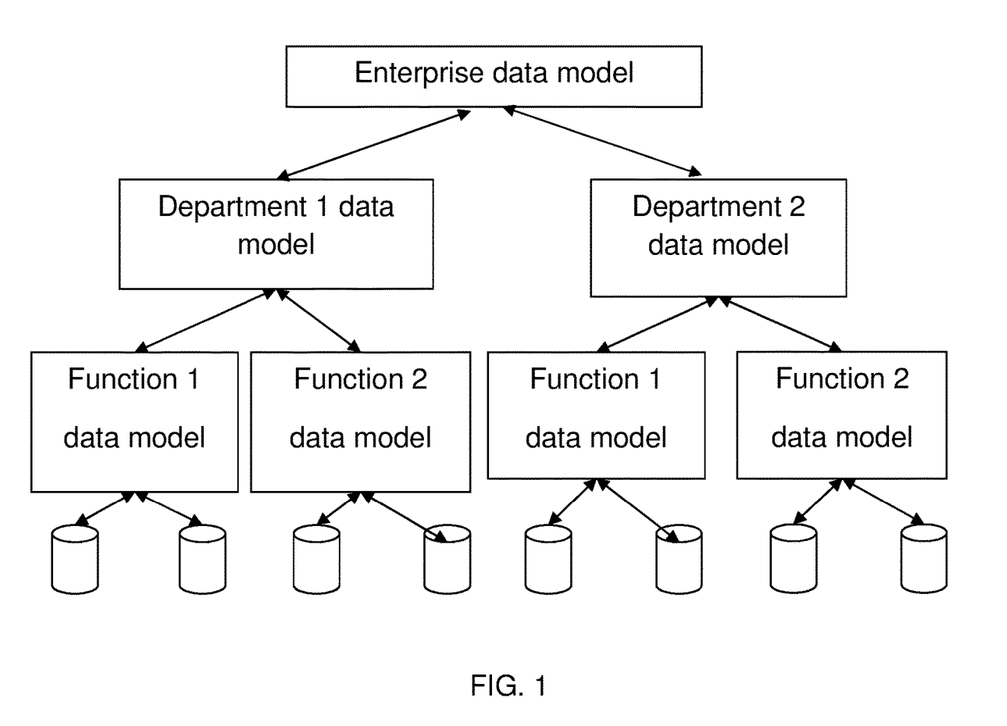
FIG. 1 represents well delineated hierarchical view of an enterprise in the present invention.

Referring now to the drawings, there are shown preferred embodiments of the invention. FIG. 1 illustrates a hierarchical structure of an enterprise where the data exists at enterprise level, department level, function level and so on. The data contained within an enterprise at hierarchical level needs to be modeled using richer conceptual models that allow modeling of data entities at multiple levels of abstraction and capture relationships existing between them. The object model is chosen as a conceptual modeling language to define unified global schema. The source model can however be defined at multiple levels using conceptual modeling framework for at least one level and conceptual model or a physical model for subsequent levels.

The model consists of Class, Attribute and Association. Classes and associations can have subtype relationships. A subtype relationship can be further qualified as complete or incomplete and as overlapping or disjoint. A class can specify a subset of its attributes as a key. Association cardinalities specify constraints on participating objects. Objects are identified by unique IDs. If a class has a defined key then its object ID is modelled as a function over the key attributes. Mappings between object models are specified in one of the following ways:

GAV (Global as view) mappings, where a class or an association at some level is specified as a view over the models at the next lower level.

LAV (Local as view) mappings, where a class or an association at some level is specified as a view over the model at the next higher level.

Rules that relate classes and associations of adjacent levels. Rules are essentially like GLAV mappings.

Subtype relationships, where a class or an association at a lower level is specified as a subtype of a class or association at the higher level.

Mapping between an object model and a relational model is specified as follows:

GAV mappings, where a class is specified as a view over a set of relations. For a class that has a primary key defined, the view must specify all its primary key attributes.

LAV mappings, where a relation is specified as a view over a set of classes.

The modelling between defined global schema and source schema employs a set of representational formalisms to represent queries, mappings and data flow graphs. The description of representational formalisms used to define conceptual modelling is illustrated below.

Query Language: In general, structured query language (SQL) is used as a language for managing data in relational databases. Since conceptual models are richer in structure, we need a more specialized query language that exploits this structure, hiding implementation details such as how the model is implemented in a relational database.

At a minimum we need a language that supports association navigation. SQL does not offer any special constructs for association navigation as it is designed for the relational model. We extend SQL with path expressions to support association navigation. We call this extended language as PSQL. PSQL can be pre-processed into equivalent SQL. Suitable examples specifying the representational format and characteristic features of PSQL is demonstrated below.

We use the following conceptual model in the examples:

Classes:
Company, Department, Person
Associations:
Company.(department/company; 1:*).Department
Department.(employee/department; *:1).Person Next, we present a set of rules that define the semantics of PSQL, and explain these rules with the help of examples.

Example 1: List the Names of Persons and their Companies

Select p.name, c.name
from Person p, Company c
where
    p.department.company=c;

In this example p.department.company is a path expression. It navigates associations from person to department and from department to company.

Rule 1: Path expressions can occur in the 'where' clause. Semantics are the same as in SQL—from the cartesian product of the relations listed in the 'from' clause, select those that satisfy the 'where' clause, and project out columns specified in the 'select' clause.

Example 2: List the Names of Companies that have Foreign Nationals

Select c.name
from Company c
where
    c.department.employee.nationality < > 'Indian';

Rule 2: Path expressions have implicit existential quantification. In the above expression, at least one employee of at least one department of a company must be a non Indian; and it is not required to have all employees of all departments of a company to be non Indians.

Example 3: List the Names of All Persons Who Work for Company 'X, and Their Departments Select p.name, d.name
from Person p, Department d
where
    p.department=d and d.company.name='X';

Example 4: List the Names of Persons and Their Companies

Select p.name, p.department.company.name
from Person p;

Rule 3: Path expressions are allowed in 'select' as well, provided they are *:1 paths. The above example is correct because the cardinalities of both the associations involved are '*:1'.

With regard to the above query language, it should be noted that it can be translated into an equivalent SQL format. Assuming a canonical representation where an association is stored as a relation with two columns corresponding to the two roles, path expressions can be translated to SQL format using the following rule.

Translation rule: Each association segment of a path expression, whether it occurs in where or select clause of the query, introduces two relations in the 'from' clause, corresponding to the association and the associated class, and corresponding join conditions in the where clause.

The above rule is elaborately discussed below using examples as shown below.

Example 1

PSQL:
Select p.name, c.name
from Person p, Company c
where
p.department.company=c;
Equivalent SQL:
Select p.name, c.name
from
Person p, Company c, Department_employee_department
    Person dp, Department d, Company_department_company Department cd
where
dp.employee=p.id and dp.department=d.id and
cd.department=d.id and cd.company=c.id;

Example 2

PSQL:
Select c.name
from Company c
where
c.department.employee.nationality < > 'Indian';
Equivalent SQL:
Select c.name
from
Company c, Company_department_company Department cd, Department d, Department_employee_department Person dp, Person p
where
cd.company=c.id and cd.department=d.id and
dp.department=d.id and dp.employee=p.id and
p.nationality < > 'Indian';

Example 3

PSQL:
Select p.name, p.department.company.name
from Person p;
Equivalent SQL:
Select p.name, c.name
from
Person p, Department_employee_department Person dp, Department d, Company_department_company Department cd, Company c
where
dp.employee=p.id and dp.department=d.id and cd.department=d.id and cd.company=c.id;

Further, the representational formalisms also include view definition language which is quite similar to the PSQL query language as discussed above. The only exception is that a view must specify attribute names of the target relation as aliases in the select clause.

An example differentiating the view definition language from PSQL query language is given below.

EXAMPLE

Suppose we have the following models:
Target: Employee(empName, address, salary, deptName)
Source: Emp(name, address, salary), Dept(name, manager) with an association <emp:dept; *:1> from Emp to Dept.
Target view definition:
select e.name empName, e.address address, e.salary salary, d.name deptName
from Emp e, Dept d
where
e.dept=d;

The conceptual modelling framework may have a set of rules that specify relationships among its elements. The rule language is thus defined to support and capture relationships which may be in the form of a constraint, a derivation or a mapping. Rules can exist in a range of forms—from rules that can be efficiently executed by a machine to rules that can only be interpreted by humans. However, the scope of the present invention is confined to machine executable rules.

These rules have the following general form:

$$\square\square\square\square\square \forall x(\phi(x) \rightarrow \exists y \psi(x,y))$$

Where x and y are tuples of variables, $\phi(x)$ is a conjunction of atomic formulas over a model of interest with variables in x and with each variable in x occurring in at least one conjunct of $\phi(x)$, and $\psi(x, y)$ is a conjunction of atomic formulas over another model of interest (could be the same as the first) with variables among those in x and y. The atomic formulas may comprise of object terms, property terms, association terms, arithmetic expressions, relational expressions and aggregation functions. One may devise any suitable surface syntax to represent the rules (such as the popular IF-THEN notation) as long as they are reducible to the above general form. One can even allow disjunctions in the surface syntax as long as they can be decomposed into rules of the above form. One can readily verify that rules, as specified above, are similar in form to GLAV mappings discussed in data integration literature [1], and hence can be decomposed into suitable GAV and LAV rules that can be used by data integration components.

Figure 2:
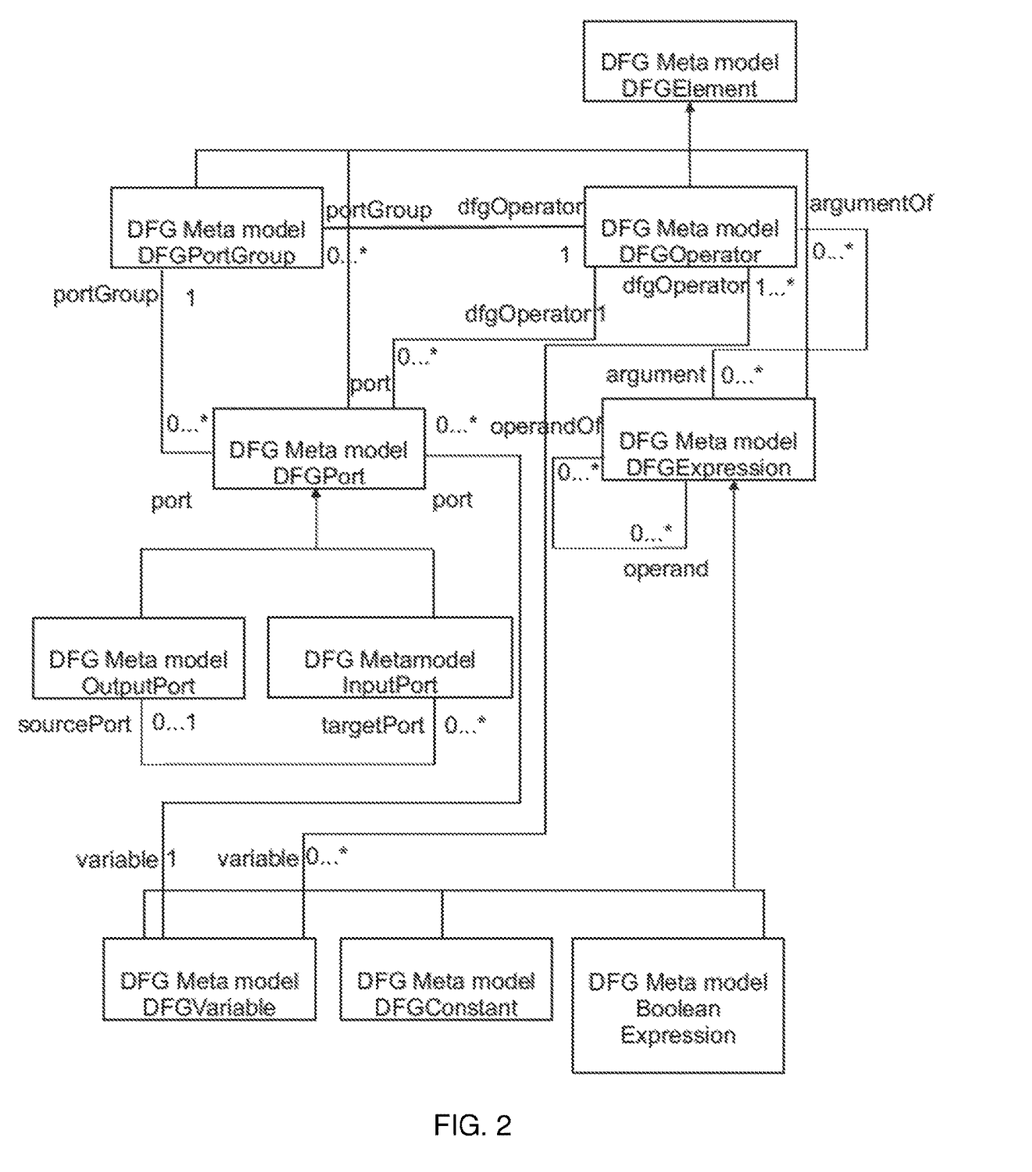
FIG. 2 highlights meta model to specify ETL data flow graphs.

The above discussed rule language also forms a part of representational formalism. Next, representational formalism includes data flow graphs using a meta model as shown in FIG. 2. The model is abstract enough and rich enough to be mappable to ETL specifications of most commercial tools.

DFG Operator is defined as the super class of all operators while the sub classes include Source Qualifier, Target, Join, Union, LookUp, Expression, etc. One can add a new operator by adding a new subclass and implementing the operator interface. An operator has a set of input ports, a set of output ports and a set of associated expressions. An operator's input flows in through the input ports and its output flows out through the output ports. The semantics of the associated expressions depends on the operator type (e.g. for join it is a relational expression). A port has an associated variable that binds to the values that flow in or flow out. The output port of one operator may be connected to the input port of another operator.

The model modeling architecture and representational formalisms discussed above enable enterprise data assets to modeled and mapped at a conceptual level of abstraction, in an implementation independent manner Next discussed is the set of primitive components from which purpose specific integration tools can be composed. The foundational primitive components so identified include the set of following stated components, which are discussed below along with supporting embodiments of the invention.

Mapping component: Mapping component helps develop mappings between models. Given two models it can discover correspondences between the models and interactively prompt a user to refine them into full-fledged mappings. It provides a user-friendly interface that hides much of the complexity of the mapping language discussed earlier. For instance, with respect to the example given earlier, when a user identifies Employee as the target and Emp and Dept as the sources, it can automatically discover the join between Emp and Dept by traversing the association between them.

Query Translation Component: Query translation component provides the following functionality:

Given a set of source models S and a set of target models T and a mapping between them (possibly via a number of intermediate model layers), translate a query $Q_s$ on S into an equivalent query $Q_t$ on T. Query translation can be performed by using a suitable query rewriting approach provided in related prior art.

Query equivalence testing component: Query equivalence testing component provides the following functionality:

Given a set of source models S and a set of target models T and a mapping between them (possibly via a number of intermediate model layers), and given two queries $Q_s$ and $Q_t$ on models S and T respectively, test if there is any containment relationship between the two (i.e. $Q_s \subseteq Q_t$ or $Q_t \subseteq Q_s$ or $Q_s = Q_t$)

This involves first translating $Q_s$ into an equivalent query $Q_{st}$ on target schema using the query translation component and then testing for containment relationship between $Q_{st}$ and $Q_t$ which is well discussed in literature.

Query to DFG translation component: This component provides the following functionality:

Given a query consisting of relations that come from multiple databases, translate it into an equivalent data-flow graph. Given below is an approach that takes a query spanning multiple databases and translates into an equivalent data-flow graph. The algorithm has three sequential steps: query segmentation, DFG generation and DFG optimization.

Query segmentation: Input query may contain subgoals from multiple sources. These subgoals need to be segmented into source specific groups. Each such segment should then be factored out as a subquery that can be executed on a single source. Emphasis is made to maximize the size of each segment so that as many subgoals as possible are pushed into a single source query.

Query Segmentation:
A graph data structure to identify query segments is constructed as described below.

A node for each relation subgoal and each expression subgoal is constructed.

An edge between two relation nodes is created if they belong to the same source and share at least one variable.

An expression node is labeled as belonging to a source S if each of its variables is either shared by a relation belonging to S or shared by another expression node that is labeled as belonging to source S.

Edges are created from an expression node labeled S to each of the relation nodes of S that share a variable with it.

Edges are created from an expression node labeled S to each expression node labeled S that shares a variable with it.

Each maximally connected subgraph that contains at least one relation node is a separate query segment. Such query segments can be separated out as subqueries. The head variables of a subquery are determined by selecting the variables of the query segment that are required outside the segment (i.e. either in the query head or in other query segments). Calls to these subqueries together with the remaining conditions make up the original query.

Before forming a subquery for a query segment it is checked if there already exists a subquery that has an equivalent query segment. If so, the subquery is reused to assist in performance optimization. This can be well illustrated using an example described below:

E.g.

Q(a1(v1), a2(v2), a3(v3)):—R1(a4(v1), a5(v4)), R2(a6 (v4), a7(v2)),

R3(a8(v1), a9(v5)), v2>v5, R4(a10(v5), a11(v6)), R5(a12 (v1), a13(v7)), v6>v7, v3=v5+v6.

Let's say R1, R2 & R3 are from source S1 and R4, R5 are from source S2.

Next, two subquery segments shall be identified:

Qs1(a4(v1), a7(v2), a9(v5)) R1 (a4(v1), a5(v4)), R2(a6 (v4), a7(v2)),

R3(a8(v1), a9(v5)), v2>v5.

It is to be noted that v4 is not there in the head since it is not required outside the query segment.

Qs2(a12(v1), a10(v5), a11 (v6)):—R4(a10(v5), a11 (v6)), R5(a12(v1), a13(v7)), v6>v7.

Similarly v7 is not there in the head since it is not required outside the query segment.

Now the original query is rewritten as:

Q(a1(v1), a2(v2), a3(v3)) Qs1(a4(v1), a7(v2), a9(v5)), Qs2(a12(v1), a10(v5), a11(v6)), v3=v5+v6.

The next phase is to describe the generation of data flow graph from segmented query representation which is an extension of the above stated example:

Generating DFG from the Segmented Query Representation:

The approach is however discussed only for certain key DFG operators and the following naming convention is used in the discussion below:

T—Target

S—Source

SQ—Source query segment

Q—Query in general

'{'<in-flow>'}'<DFG-operator>['('<parameters>')']
'{'<out-flow>'}'—DFG operator

DFG(<query>)—DFG transformation of the query fragment <query>

Outer query corresponds to the target, and inner queries correspond to the intermediate nodes and source-specific queries correspond to the sources. We generate DFG jobflow backwards starting from the target.

In the following it is discussed how different query forms map to different DFG operators:

| Query form | DFG operator |
|---|---|
| Q(<head-var-list>) :- Q1(<Q1-var-list>), Q2(<Q2-var-list>),.., Qm(..), <Q cond>. | {DFG(Q1(<Q1-var-list>)), DFG(Q2(<Q2-var-list>)), .., DFG(Qm(<Qm-var-list>))} JOIN(<Q cond>) {<head-var-list>} |
| Q(v1,..,vj, <aggr>(vk)) :- <body> | {DFG('Q(v1,..,vj, vk)) :- <body>')} <aggr>(vk, vk-aggr-value) {v1,..,vj, vk-aggr-value} |
| Q(v1,..,vn) :- SQ1(vi, vj,..vk), SQ2(..),.., SQm(..), <Q cond>. SQ1(v1,..,vl) :- R1 (<arg1>), R2(..),.., Rs(..), <SQ1 cond>. | {DFG(R1 (<arg1>)), DFG(R2(<arg2>)),.., DFG(Rs(<argS>))} JOIN(<SQ1 cond>) {v1,..,vl} Where if possible <cond> should be split and pushed down to R* (using the usual optimization techniques), resulting in: {R1} SELECT(<R1 cond>) {<R1 columns>} PROJECT(<arg1>) {<arg1>} |
| Q(v1,..,vn) :- <body1> Q(v1,..,vn) :- <body2> .. Q(v1,..,vn) :- <bodyk> | { DFG('Q(v1,..,vn) :- <body1>'), DFG('Q(v1,..,vn) :- <body2>'),.., DFG('Q(v1,..,vn) :- <bodyk>') } UNION {v1,..,vn} |
| Q1(..) :- <body1>, Qk(<SQk-var-list>). Q2(..) :- <body2>, Qk(<SQk-var-list>). .. Qn(..) :- <bodyn>, Qk(<SQk-var-list>). | {DFG(Qk(<Qk-var-list>))} SPLIT {<Qk-var-list-1>, <Qk-var-list-2>,..,<Qk-var-list-n>} |

-continued

| Query form | DFG operator |
|---|---|
| | Where <Qk-var-list-i> is one of the inputs -- corresponding to the subgoal Qk(..) -- to the JOIN operator corresponding to 'Qi(..) :- <bodyi>, Qk(<Qk-var-list>)'. |
| Q(v1,...,vn) :- <body1>, not Q2(vi,...,vk). Refactor this query as below: Q(v1,...,vn) :- <query that selects (vi,...,vk)>, <query that selects rest of (v1,...,vn)>, <cond>, not Q2(vi,...,vk). | { ( {DFG(<query that selects (vi,...,vk)>), DFG(Q2(vi,...,vk))} DIFF {vi,...,vk} ), DFG(<query that selects rest of (v1,...,vn)>) } JOIN(<cond>) {v1,...,vn} |
| We view lookup as a join operation, but on a table that is marked as a lookup table. Q(v1,...,vl,...,vn) :- <body>, LT(vk, vl) Where 'vk' is a key variable selected in <body>, and LT is a lookup table that stores surrogate keys. | {DFG(<body>)} LOOKUP(LT, vk, vl) {v1,...,vl,...,vn} |
| Function application: Functions occur in expression subgoals: Q(v1,...,vf,...,vn) :- <body that selects the rest of (v1,...,vn)>, vf = f(vi,...,vk). | DFG(<body that selects the rest of (v1,...,vn)>)} FUNC(f, (vi,...,vk), vf) {v1,...,vf,...,vn} |

As described in the above table DFG can be generated by mapping different query forms to their corresponding DFG operators. The generated DFG can be optimized further by using techniques similar to the ones used in query graph optimization which are well documented in literature.

DFG to query translation component: This component provides the following functionality:

Given a data flow graph (DFG) that computes a target data view from a set of relations that come from one or more source databases, translate the DFG into an equivalent query on the relations. The translation consists of two procedures as described below:

Operator-to-Query Procedure:

The query corresponding to each operator (except Source Qualifier instances) has the following format:

Select clause contains the names of output ports.

From clause contains sub-queries corresponding to the operators whose output ports are connected to the input ports of this operator, with sub-query aliases set to the names of the corresponding input operators.

Where clause is derived from the expressions associated with the operator. Its precise form depends on the semantics of the operator type; for example in the case of join operator the expressions are simply dumped into the where clause after replacing all references to input ports by their corresponding subquery qualified names, i.e. <operatorName.portName>.

Source Qualifier operator has an associated query which is simply dumped as is.

DFG-to-Query Procedure:

Formulate the query of the target operator using the procedure described above. The sub-query creation would iteratively traverse backwards towards the sources. Effectively queries corresponding to all the operators are created. We are however interested only in the query corresponding to the Target Operator, as this corresponds to the Query of the DFG.

This query is then optimized to remove duplicate sub queries. This is done after it is converted to an internal representation. This is done to avoid reevaluation of the same sub query thereby contributing to performance optimization.

Discussed next is a matching component which can be used to figure out matching entity instances in two databases. Its capability to provide such functionality is exemplified below:

Matching Component: Given two database schemas $S_1$ and $S_2$ that are mapped to a common global schema G, and given a specification to detect duplicate instances in G (i.e. a deduplication specification over G), and given two database instances $I_1$ and $I_2$ of schemas $S_1$ and $S_2$ respectively, output all matching object pairs from $I_1$ and $I_2$ as tuples of the form <S1: <entity>, S2: <entity>, <pk1-value tuple>, <pk2-value tuple>>.

Where each tuple identifies an entity instance in $I_1$ and its corresponding matching entity instance in $I_2$. This list of tuples is called as an object map.

The deduplication specification essentially identifies when two instances of an entity in the global schema refer to the same underlying entity.

E.g.

Following model exists in global schema:

Dept, Emp

Dep.(emp(0..*)/dept(1)).Emp

There might exist following matching specification when two employee instances can be considered to refer to the same real-world employee.

Match e1,e2:Emp when {
e1.dob=e2.dob
and
approx_match(e1.name. e2.name, 80)
and
e1.dept.name=e2.dept.name
}

Platform specific component: A platform specific component translates between internal representations of queries and DFGs and their platform specific representations. One such component exists for each supported platform. They provide the import/export bridge between the tool and third-party platforms, and thus play a key role in the overall architecture.

For example, from internal representation of DFG to Informatica ETL representation, or from internal representation of query to Oracle specific representation, and so on.

After identification of all essentially required set of primitive components, next required is the composition of purpose specific integration tools, the method for which is discussed here forth.

Composing Purpose Specific Integration Tools

We discuss how the modeling framework and the primitive components discussed above can be used to compose integration tools. This is illustrated with a few known tool categories as given below:

Enterprise Information Integration (EII) Tool

Figure 3:
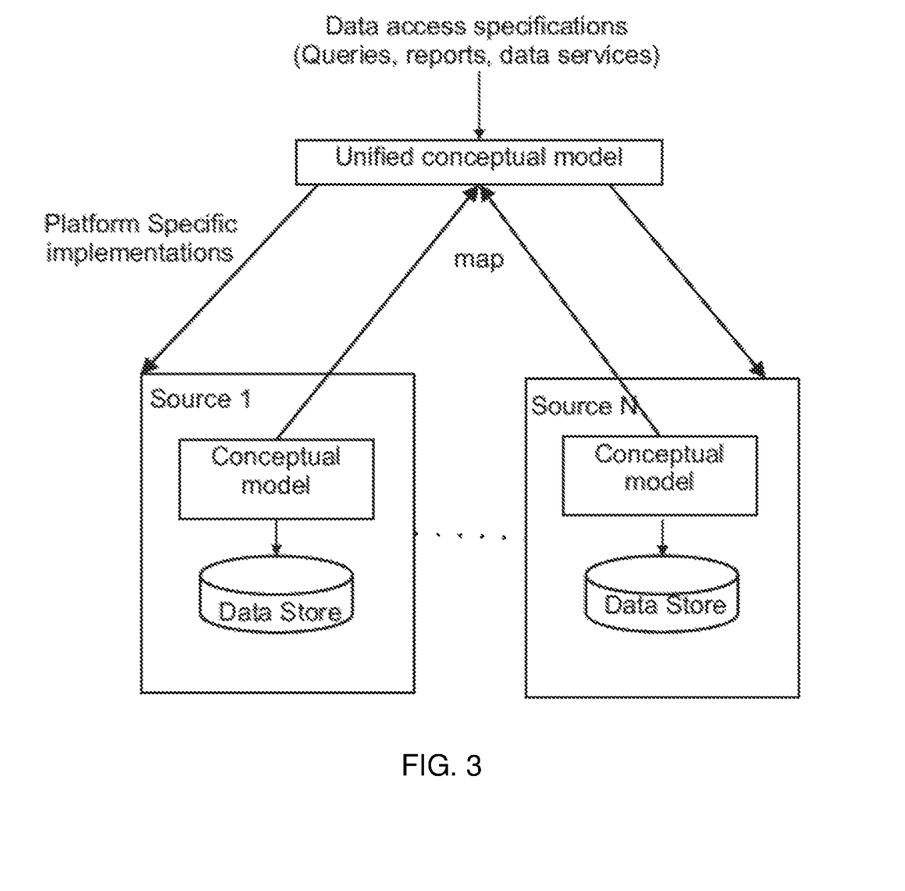
FIG. 3 is a schematic illustration of an EII (Enterprise information integration) tool composed from primitive components.

EII tools enable a unified view of data by mapping a set of database schemas to a unified global schema. They provide a query interface in terms of the global model. The tool translates these queries into data source specific queries and assembles the results returned by the data sources. Composition of an EII tool from the primitive components is shown in FIG. 3. The method for constructing EII tool using defined foundational components includes the steps of:

Using the conceptual modeling framework to create the data models.
  Using the mapping component to specify mappings between these models.
  Using the query translation component to translate a unified model query into an equivalent target query involving relations from across source schemas.
  Using the 'query-to-DFG' component to translate the target query into an equivalent DFG and finally
  Translating the DFG into third party ETL and executing it or executing the DFG directly using the DFG execution component.

Extract, Transform and Load (ETL) Tool

Figure 4:
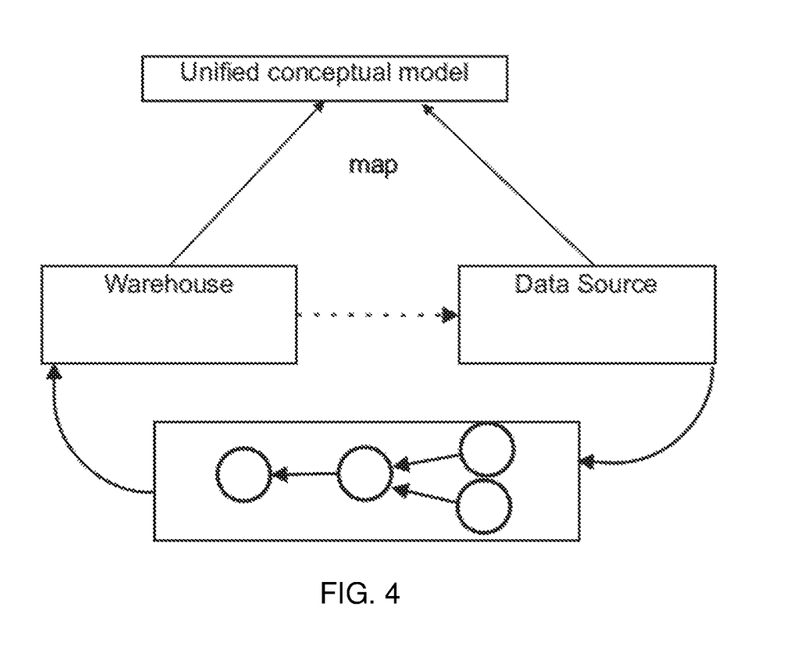
FIG. 4 depicts an integration tool that combines ETL and EII wherein ETL is used to build a warehouse and EII is used to access data uniformly from both warehouse and original sources.

An ETL tool from the primitive components can be composed as shown in FIG. 4, the method describing which is as follows:

Use the modeling tool to build warehouse model, source models and global model if any.
  Use the mapping tool to map the warehouse schema either to the global schema or to the source schemas directly.
  Treat these mapping views as source queries and use the query translation component to translate these queries into equivalent target queries on data source models.
  Use the 'query-to-DFG' component to translate the target queries into equivalent DFGs and
  Translate the DFGs into third party ETL or execute the DFGs directly using the DFG execution component.

Figure 5:
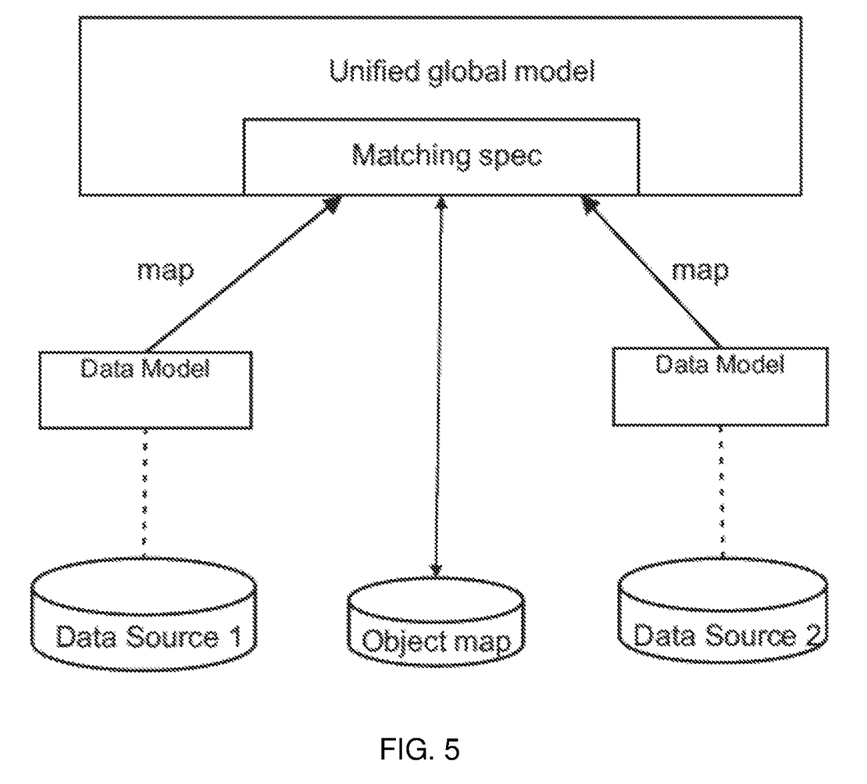
FIG. 5 is a schematic representation of Data synchronization tool composed from primitive components.

Data Synchronization Tool:

A tool to synchronize data sources can be composed as follows:

Use the modeling tool to build source models and a unified global model.
  Use the mapping tool to map the source models to the global model.
  Use the matching tool to specify entity matching specifications on the global model and generate the object map.
  For each update on a source entity, consult the object map to get the matching entities in other sources and use the query translator component to translate update statements into equivalent update statements on matching sources, and execute these update statements on the sources as shown in FIG. 5.

Data Migration Tool

Data migration involves not only database migration but migration of various data access programs as well, such as queries, stored procedures, ETL specifications, etc.

Figure 6:
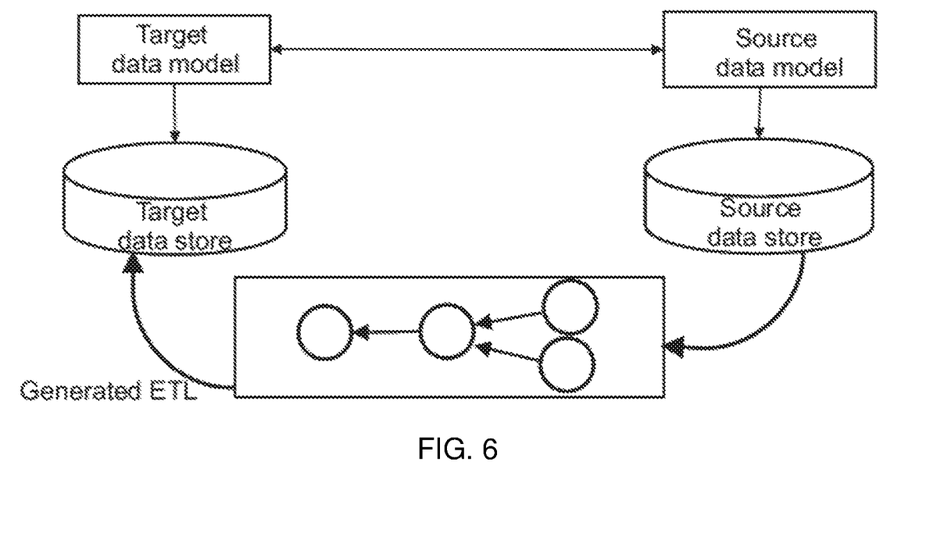
FIG. 6 is a representation of Data migration tool for translating queries from source model to target model, and for generating ETL to migrate data from source database to target database.

We can compose relevant tool as shown in FIG. 6, the method for which is detailed as follows:

Use the modeling tool to model source schemas and target schemas
  Use the mapping component to specify mappings between them
  Form pseudo queries corresponding to each target table (select * from <target_table>) and use the query translation component to translate these queries into source specific queries.
  Either execute these queries directly (if there is only one source database) or use the 'query-to-DFG' component to generate equivalent DFGs (and there from tool specific ETLs if required).
  Translate queries on the source schema into equivalent queries on the target schema using the query translator component.

Similarily, source specific ETL specifications are translated into equivalent target specific ETL specifications using the following procedure:

Use the 'DFG-to-query' component to translate source ETL specification into equivalent composite source queries.
  Use the query translator component to translate these composite source queries into equivalent target queries.
  Use the 'query-to-DFG' component to translate these target queries into equivalent target DFGs, and use the platform specific ETL translator to translate these DFGs into target specific ETL specifications.

The present invention besides providing a solution for creating purpose specific integration tools also discloses a method by which migration from one solution architecture to another can be implemented. The interoperability among different integrating tools available is discussed below.

Migrating from one solution architecture to another: The migration process from one solution to another is illustrated by the cases involving currently available integration tools.

Migrating from an EII Solution to an ETL Solution

In one of the embodiments of the present invention, a method of migrating from an EII solution platform to an ETL platform solution is provided using the primitive foundational components. Suppose instead of executing the queries on the virtual global model to extract required data views, there is a need to materialize those data views into a warehouse using an ETL like approach, say in order to improve the response time. Given below is the method of migrating to the new solution:

Translate the requisite global queries into equivalent source queries using the query translation component.
  Translate these queries into equivalent DFGs using the 'query-to-DFG' component.
  Translate these DFGs into target platform specific ETLs.

Migrating from an ETL Solution to an EII Solution

In one other embodiments of the present invention, a method of migrating from an ETL solution to an EII platform solution is provided. The method uses purpose specific tools for such migration composed from a set of primitive foundational components. Suppose we have a warehouse and an ETL mapping from sources to populate the warehouse, and we want to migrate to a new solution where we want to make the warehouse views virtual and on-demand so as to improve latency. Discussed below is a solution how to migrate to a new solution:

Turn the warehouse schema into the global schema.

Translate platform specific ETL specifications into equivalent DFGs.

Translate each DFG into an equivalent composite source query using the 'DFG-to-query' component. Turn this query into a mapping view specification of the corresponding global schema table and finally Turn all warehouse queries into equivalent global schema queries.

Hence, the proposed conceptual modelling architecture allows enterprise integration to be modelled at a semantic level, capturing rules and constraints that govern the behaviour of models and their mappings and the set of primitive components presented are sufficiently general purpose in nature that can be used to compose purpose specific integration tools.

The integration architecture here presented in the disclosure thus enables easy migration from one integration solution to another.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the embodiments of the invention can be practiced with modification within the spirit and scope of the appended claims.

We claim:

1. A method for building data integration tools that facilitate interoperability of data integration solutions among data integration platforms, the method comprising:
   receiving source schemas from a plurality of data sources, wherein the source schemas are associated with the data integration solutions in the data integration platforms;
   generating a unified source schema from the source schemas;
   querying data based on the unified source schema of an enterprise using an input query in a query language, wherein the data is categorized in the source schemas in accordance with a hierarchical structure of the enterprise, wherein the input query comprises a plurality of sub-goals targeting the data to be identified from the unified source schema;
   capturing relationships among the data by specifying a constraint and a rule associated with the data in the query language;
   segmenting the plurality of sub-goals into groups of sub-goals, wherein each group of sub-goals correspond to a data source of the plurality of data sources;
   creating a plurality of nodes for the plurality of sub-goals and for expressions of the plurality of sub-goals such that each sub-goal and each expression of a sub-goal is individually associated with a node;
   creating an edge between two nodes of the plurality of nodes when the two nodes share a common variable and belong to a same group of sub-goals;
   generating sub-queries for the groups of sub-goals such that each sub-query corresponds to a group of sub-goals, wherein before forming the sub-query for a query segment, the sub-query is checked for its existence with an equivalent query segment in a graph data structure and reused to assist in performance optimization when there exists the sub-query with the equivalent query segment;
   executing the sub-queries on data sources corresponding to the groups of sub-goals; and
   constructing a data flow graph for building data integration tools based upon the relationships among the data and the execution of the sub-queries, wherein the data flow graph is presented using rich meta models and a set of semantically invariant graph transformation operations are performed on the data flow graph to obtain an optimal execution order on data flow operations, wherein the data flow graph is generated by mapping query forms to corresponding data flow graph operators, and each data flow graph operator include a set of input ports, a set of output ports and a set of associated expressions, wherein the query form represented Q (<head-var-list>) is mapped to the data flow graph operator DFG(Qm(<Qm-var-list>)).

2. The method of claim 1, further comprising integrating the unified source schema and a target schema by creating target queries in the query language corresponding to the sub queries based on the data flow graph in the target schema.

3. The method of claim 1, further comprising matching specification for instances of entities present in the unified source schema to identify duplicate instances of the entities present in the source schemas, and output matching object pairs from the instances as tuples.

4. The method of claim 1, further comprising testing a relationship between two queries on the source schemas.

5. The method of claim 1, further comprising mapping the unified source schema and the source schemas using the data flow graph.

6. The method of claim 1, wherein the source schemas are used by at least one of Enterprise Information Integration (EII) tool, or an Extract, Transform and Load (ETL) tool, or a data synchronization tool, or a data migration tool.

7. The method of claim 6, further comprising composing the data migration tool, the composing comprising:
   receiving a mapping between the source schemas and the target schema;
   formulating the input query corresponding to an entity present in the target schema;
   translating the input query to the target query corresponding to the source schemas;
   generating the data flow graph for the target query; and
   executing the data flow graph to migrate the data from the source schemas to the target schema.

8. The method of claim 6, further comprising composing the Extract, Transform and Load (ETL) tool, the composing comprising:
   receiving a mapping between a warehouse schema and at least one of: the unified source schema or the source schemas;
   formulating the input query corresponding to an entity in the warehouse schema;
   translating the input query to an equivalent query on the source schemas;
   converting the equivalent query into the data flow graph; and
   executing the data flow graph to compose the Extract, Transform and Load (ETL) tool.

9. The method of claim 8, further comprising migrating from the ETL tool to the EII the migrating comprising:
  converting the warehouse schema into the unified source schema;
  translating specifications for instances of entities in the ETL tool into a data flow graph;
  translating the data flow graph into an equivalent query; and
  converting the equivalent query into a mapping view specification of the unified source schema.

10. The method of claim 6, further comprising composing the Enterprise Information Integration (EII) tool, the composing comprising:
  receiving a mapping between the unified source schema and the source schemas;
  receiving the input query on the unified source schema;
  translating the input query to the target query on the source schemas;
  converting the target query to the data flow graph; and
  executing the data flow graph to compose the Enterprise Information Integration (EII) tool.

11. The method of claim 10, further comprising migrating from the Enterprise Information Integration (EII) tool to the Extract, Transform and Load (ETL) tool, the migrating comprising:
  translating the input query of the EII into an equivalent source query;
  translating the equivalent source query into the data flow graph of the EII; and
  translating the data flow graph of the EII into a data flow graph of the ETL.

12. The method of claim 6, further comprising composing the data synchronization tool, the composing comprising:
  receiving a mapping between the unified source schema and the source schemas;
  receiving matching specification for instances of entities on the unified source schema;
  generating an object map to identify the instances of entities matched based on the snatching specification, wherein the object map comprises a tuple to identify the matching of the instances of entities in the source schemas;
  translating an update statement of an entity in the source schemas into an equivalent update statement on the instances of the entities matched based on the object map; and
  executing the equivalent update statement to compose the data synchronization tool.

* * * * *